March 6, 1962  L. H. SCHMOHL  3,024,047
FLARED TUBE COUPLING HAVING A THIN FILM SEALING MEANS
Filed Jan. 20, 1958

INVENTOR.
LELAND H. SCHMOHL
BY
Oberlin & Limbach
ATT'YS

United States Patent Office 3,024,047
Patented Mar. 6, 1962

3,024,047
FLARED TUBE COUPLING HAVING A THIN
FILM SEALING MEANS
Leland H. Schmohl, Chagrin Falls, Ohio, assignor to
Parker-Hannifin Corporation, Cleveland, Ohio, a corporation of Ohio
Filed Jan. 20, 1958, Ser. No. 709,919
3 Claims. (Cl. 285—332.2)

The present invention relates generally as indicated to a tube coupling, and more particularly, to a coupling for flared tubes in which the conical seat thereof which engages within the flared end of a tube has a sealing film affixed thereto.

Heretofore, considerable difficulty has been encountered in forming a fluid-tight joint between the flared end of a tube and the coupling member with which the tube flare is engaged, when the coupling member and tube are made of hard and tough materials such as certain grades of stainless steel which are characterized in that the mating surfaces work harden when the tube and coupling joint is made up. Thus, irregularities on the mating surfaces of the tube flare and the coupling member cannot be "ironed" out as occurs with tubes and coupling members made of metals such as copper, brass, aluminum, aluminum alloy, etc. The leakage problem aforesaid may be alleviated to some extent by accurately forming and polishing the mating surfaces but, obviously, this expedient is much too expensive to be of any commercial value. Moreover, because drawn tubing is employed most frequently it is inevitable that the inside surface will have lengthwise extending scratches or imperfections and when the tubing is made of hard and tough metal as aforesaid, it is virtually impossible, with the forces available from the threaded connections of coupling members, to iron out such scratches or imperfections whereby a leaky joint is inevitable. Of course, hairline scratches or other imperfections on the inside of the tube flare may also result from the flaring operation.

Accordingly, it is a principal object of this invention to provide a flared tube coupling which obviates the foregoing difficulties and assures the formation of a durable fluid-tight joint between a coupling member and a flared tube despite the hardness or toughness of the material from which the tube and tube coupling may be fashioned, and despite the presence of the usual scratches or tool marks on the flare-engaging seat of the coupling member and inside the tube flare.

It is another object of this invention to provide a flared tube coupling in which the flare-engaging seat has affixed thereon a thin sealing film which is of thickness to establish a fluid-tight seal within the tube flare and to preclude extrusion of the film under the influence of clamping pressure and/or fluid-pressure.

It is yet another object of this invention to provide a flared tube coupling of the character indicated in which the film-coated conical seat for the flared tube has an included angle which is between about 60° and 90°, preferably 74°, and in which the included angle of the inside of the tube flare is the same as that of the conical seat so as to provide a relatively wide surface contact between the tube flare and the conical seat, thereby reducing unit stresses on the sealing film.

It is still another object of this invention to provide a flared tube coupling of the character referred to above in which a thin sealing film is bonded to the conical flare-engaging seat, the film being of a material that has a waxy or slippery feel, that is inert when exposed to a wide variety of fluids, and that is capable of withstanding wide variations in temperature.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in retail a certain illustrative embodiment of the invention, this being indicative, however, of but one of the various ways in which the principle of the invention may be employed.

Figure 3:
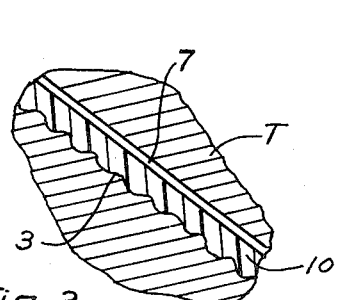
Figure 4:
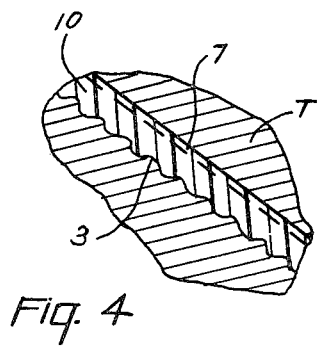

FIG. 3 is still another much enlarged fragmentary cross-section view showing the sealing film as bonded on the conical seat of the tube coupling and showing a hairline scratch or imperfection on the inside of the tube flare; and FIG. 4 is a fragmentary cross-section view similar to FIG. 3 except showing how the sealing film is deformed to establish a fluid-tight joint with the tube flare under the influence of clamping pressure on the tube flare, the film not only being sealed against the tube flare but also sealed against the imperfections on the surface of the conical seat.

Referring now in detail to the several figures of the drawing, the flared tube coupling assembly herein shown, comprises threadedly engaged coupling members 1 and 2 of which the coupling member 1 is externally threaded and terminates in a coaxial frusto-conical flare engaging seat 3, preferably having a taper of about 37°. The angle of taper of seat 3 may vary between about 30° and 45° while retaining certain advantages of the invention. The other coupling member 2 is internally threaded and may be formed as of hex bar stock to provide wrench-engaging flats by which it is adapted to be screwed tightly onto the coupling member 1. Said coupling member 2, usually referred to as a "nut," has a radially inwardly extending flange 4 through which the tube T extends and which serves, through the head 5 of the sleeve 6, to clamp the flared end of the tube T against the seat 3 of the coupling member 1 when said nut 2 is tightened on the coupling member 1. It is to be understood that the nut 2 and sleeve 6 may be integrally formed but it is preferred herein to employ the two-piece construction shown so as to minimize turning of the tube T during joint makeup and also to enable coaxial disposition of the sleeve 6 with respect to the tube T and coupling member 1 despite eccentricity of the threads of coupling member 1 and/or of nut 2.

The flared tube T herein has an inner face 7 that is frusto-conical and has the same included angle as the conical seat 3. Thus, when the taper of the seat 3 is 37°, as herein preferred, the taper of the inside face 7 of the tube flare will likewise be 37°. Since in flaring a tube there is a thinning of the wall progressively outwardly, the angle of taper of the outside face 8 of the tube flare will be somewhat less than the angle of the conical seat 3. For the range of wall thicknesses of tubes T that are commercially available it has been found that the angle of taper of the outside face 8 of a tube flare is approximately 4° less than the angle of taper of the inside face 7. Thus, when the conical seat 3 and inside face 7 of the tube flare are of 37° taper, the outside surface 8 of the tube flare will be about 33°. Accordingly, the sleeve 6 in this case will be formed with a countersink 9 having a taper of 33° to match the taper of the outside face 8 of the tube flare.

Figure 1:
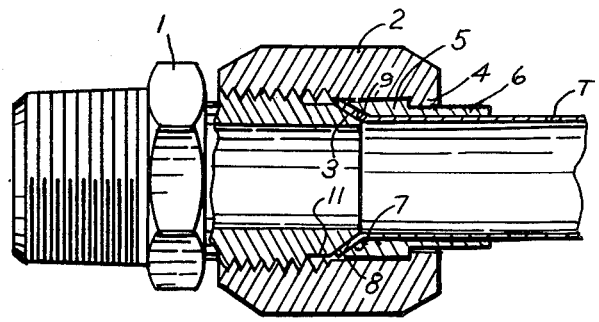
FIG. 1 is a side elevation view, partly in cross-section, showing a preferred embodiment of this invention in which coupling members are threadedly engaged together to clamp the flared end of a tube against the conical seat of one of the coupling members.
Figure 2:
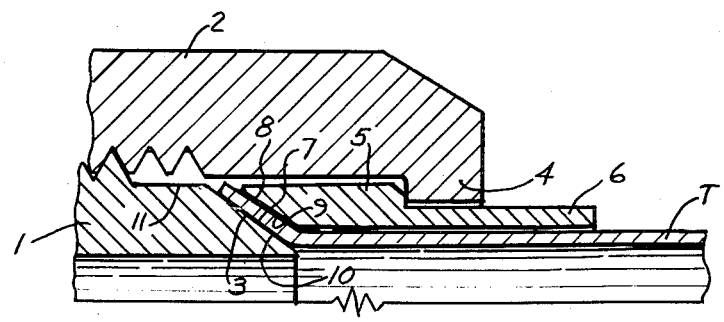
FIG. 2 is a fragmentary cross-section view of the FIG. 1 embodiment (on much enlarge scale) showing the sealing film which is bonded to the flare-engaging seat of one coupling member for engagement within the flared end of a tube.

Referring further to the sleeve 6, the corner at the outer end of the head 5 may be slightly broken or radiused, as shown, and the exterior surface of the head 5 may be slightly tapered, 1° for example, as best shown in FIG. 2, to allow resilient expansion of the sleeve 6 as the nut 2 is tightened on the coupling member 1 without causing binding between the exterior of the head of the sleeve and the interior surface of the nut 2.

As previously mentioned, when the coupling member 1 and tube T are made of a hard and tough metal such as certain grades of stainless steel, that are characterized by their work hardening properties, it is virtually impossible to obtain a fluid-tight joint between the tube flare and the seat 3 of the coupling member 1 because the degree of clamping force available through the threads by the tightening of the nut 2 is not sufficient to iron out the imperfections in the mating surfaces of the seat 3 and of the tube flare. Examples of metals of the character indicated are: American Iron and Steel Institute (A.I.S.I.) types 302, 303, 304, and 316 stainless steels.

To achieve a fluid-tight seal under these circumstances and to achieve other desirable and necessary properties, it is herein proposed to provide a thin film 10 of a certain plastic material interposed between the tube flare and the conical seat 3 of the coupling member 1. One especially satisfactory material for use as the sealing film 10 is tetrafluoroethylene resin. That material has a waxy or slippery feel and when affixed to the seat 3 of the coupling member 1 as by bonding as hereinafter explained in detail to provide a coating of thickness not less than about .0003" and not more than about .0005", is very effective for establishing a seal. Should the sealing film 10 be of thickness less than the above-referred to minimum thickness it has been found that there is not enough material in the film 10 to seal the irregularities that are encountered on the seat 3 itself or in the inside face 7 of the tube flare. On the other hand, if the thickness of the sealing film 10 exceeds about .0005", the material will extrude or cold flow to thus reduce the efficacy of the seal.

Tetrafluoroethylene resin is non-toxic and does not contaminate liquid foods, fruit juices etc. whereby the coupling assembly herein may be safely used in installations handling such fluids and, of course, at least the metals from which the coupling member 1 and tube T are made are selected so as to be inert in the fluids being handled. Aside from its chemical inertness in most chemicals, fuels, oils, solvents, etc., tetrafluoroethylene is resilient and tough, has a waxy or slippery surface to minimize friction, has anti-stick properties so as not to adhere on the inside face 7 of the tube flare, and withstands temperatures from as low as minus 450° F. to as high as 500° F.

The sealing film 10 herein is preferably applied by spraying an aqueous dispersion of raw tetrafluoroethylene resin onto the sand blasted finish of the seat 3 of the coupling member 1, this providing for good adhesion of the sprayed film on the seat 3. Before spraying, it is well to clean and to pre-heat the substrate, that is, the seat 3 to a temperature of about 750° F. to decompose and drive off foreign matter in the metal pores. The sand blasting should be done with the finest grit and at low pressure to avoid excessive pitting and in the case of smooth surfaces fine grit emery paper may be used to scuff the surfaces. After the spraying operation, the coupling member 1 is pre-baked at about 200° F. to drive off moisture and to eliminate bubbles and crazing. Thereafter the coupling member 1 is heated to about 750° F. for a period of about 9–12 minutes to cure the sealing film 10.

Preferably, the film 10 extends from the seat end of the coupling member 1 throughout the length of the conical seat 3 but, if desired, the film 10 may be extended up to the beginning of the external threads or even onto the threads. However, since the film 10 is not required on the threads, nor on the cylindrical land 11, it is considered uneconomical to thus waste this rather expensive spraying composition.

One way of accomplishing the spraying of the seat 3 is to form an opening in a sheet or plate which is of thickness corresponding to the axial length of the land 11 and of diameter to closely or snguly fit on said land 11. The end of the coupling member 1 may be closed as with a suitable cork whereupon only the conical seat 3 and the end surface of the coupling member 1 is exposed for spray coating.

Because of the superior characteristics of tetrafluoroethylene as the sealing film 10 in the instant flare tube coupling, there is not involved any selection of alternate materials for different fluids, for different pressures, for different temperatures etc. In other words if the bare metal coupling parts can withstand the service conditions so can the coupling with the tetrafluoroethylene film 10 on the seat 3 with very few exceptions; for instance, if the temperatures are substantially greater than 500° F., if hot fluids above 200° F. such as hydrochloric or nitric acids are to be handled, but service conditions as severe as these are so rarely, if ever, encountered as to have any bearing on the utility of the coupling for the general and also quite severe conditions which it will safely withstand. The coupling herein also is not harmed by repeated makeups since the tetrafluoroethylene film 10 is firmly bonded to the seat 3, and has good non-adhesion properties so as not to stick on the inside face 7 of the tube flare. The film 10 has the required toughness and resilience so as not be scrubbed or worn off the seat 3 by making up the joint or by repeated makeups and to be deformable to establish a fluid-tight seal despite scratches, pits, or other irregularities that may be present on the inside face 7 of the tube flare.

It is believed also that the durability of the film 10 of tetrafluoroethylene on the seat 3 is due to the specific taper of the seat 3 and to the very low coefficient of friction of the film 10 with the tube flare. Accordingly, when the tube flare is urged axially toward the seat 3 by the sleeve 6, the inside face 7 makes wide surface contact with the film coating on the seat 3 whereby the tangential force component (parallel to the seat 3) is not greatly effective to tend to shear the film 10 but instead the predominant force is the normal force component (perpendicular to the seat 3) which imposes a direct compressive load on the film 10. Because the film 10 is so thin (.0003" to .0005") it cannot be extruded from between the seat 3 and the face 7 of the tube flare and therefore behaves much like a confined body of incompressible liquid while filling in the voids, pits, scratches, and other irregularities in the face 7.

Although the film 10 might be bonded on the face 7 of the tube flare this is not considered practical since the coupling manufacturer usually does not supply flared tubes to the customer except when a pre-assembled panel or system is sold. Furthermore, every customer for a film-seal coupling assembly would have to be equipped, not only to flare the tubes, but, to spray the film on the inside of the tube flares.

Other modes of applying the principle of the invention may be employed, change being made as regards the details described, provided the features stated in any of the following claims, or the equivalent of such, be employed.

I therefore particularly point out and distinctly claim as my invention:

1. In combination, a flared tube; and coupling members fastened together and defining therebetween a cavity to receive and to clamp the flare of said tube against one coupling member responsive to fastening together thereof; said one coupling member being formed with a frusto-conical seat having a taper substantially the same as the taper of the inside face of the tube flare; said one coupling member and said tube being made of work hardening metal whereby irregularities on such seat and on the inside face of the tube flare are not ironed out when said coupling members are fastened together; such seat having affixed thereto a thin resilient film of a resin having properties like those of tetrafluoroethylene resin and having a thickness of from about 0.0003″ to about 0.0005″ sufficient to seal such irregularities even against leakage of gas such as helium but insufficient to permit extrusion of the film due to clamping pressure or to fluid pressure.

2. The combination of claim 1 wherein the seat of said one coupling member is of frusto-conical form having a taper of from about 30° to about 45°.

3. The combination of claim 1 wherein the seat of said one coupling member is of frusto-conical form having a taper of about 37°.

References Cited in the file of this patent

UNITED STATES PATENTS

| | | |
|---|---|---|
| 149,070 | Ryan | Mar. 31, 1874 |
| 839,090 | Ayer | Dec. 25, 1906 |
| 2,062,305 | Gillette | Dec. 1, 1936 |
| 2,453,813 | Prince | Nov. 16, 1948 |
| 2,498,831 | Veitch | Feb. 28, 1950 |
| 2,741,498 | Elliott | Apr. 10, 1956 |

FOREIGN PATENTS

| | | |
|---|---|---|
| 770,774 | Great Britain | Mar. 27, 1957 |